(No Model.)

J. STAUFFER.
WIRE FENCE STRETCHER.

No. 536,304. Patented Mar. 26, 1895.

Witnesses:
Lester L. Allen
Alfred J. Fiorini

Inventor.
John Stauffer
By R. J. McCarty,
Attorney.

United States Patent Office.

JOHN STAUFFER, OF DAYTON, OHIO.

WIRE-FENCE STRETCHER.

SPECIFICATION forming part of Letters Patent No. 536,304, dated March 26, 1895.

Application filed May 26, 1894. Serial No. 512,559. (No model.)

*To all whom it may concern:*

Be it known that I, JOHN STAUFFER, of Dayton, county of Montgomery, State of Ohio, have invented a new and useful Improvement in Wire-Fence Stretchers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in wire stretchers for fences.

The object of the invention is to further improve and perfect a device of this character that was patented by myself June 13, 1893, No. 499,260.

To this end I produce improvements that will be fully described in the following specification and pointed out in the claim.

The annexed drawings are referred to, in which—

Figure 1:
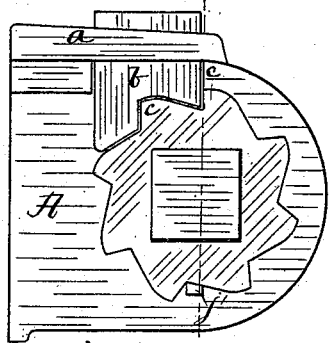
Figure 2:
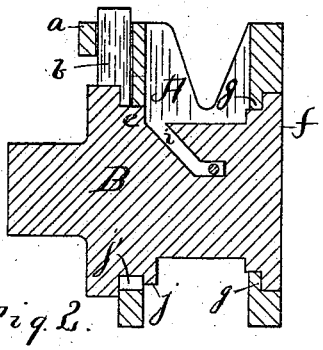
Figure 3:
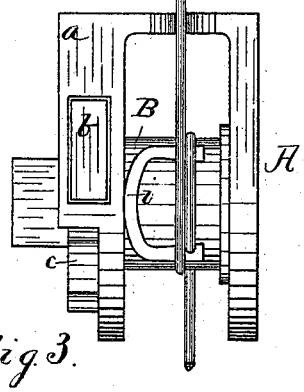
Figure 4:
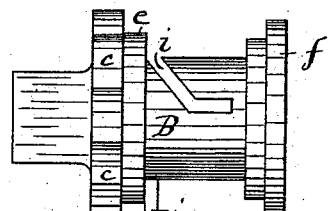
Figure 5:
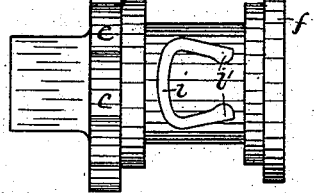
Figure 6:
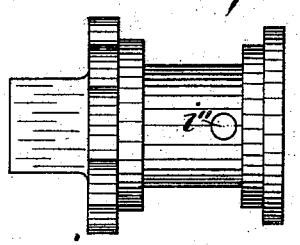
Figure 7:
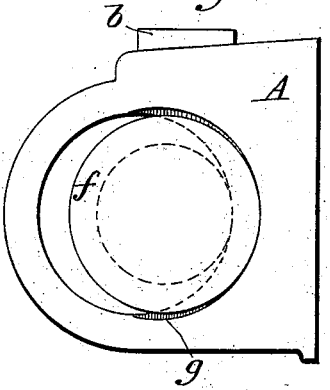

Figure 1, is a side elevation of my improved stretcher. Fig. 2, is a vertical section on the line $x$—$x$ of Fig. 1. Fig. 3, is a top plan view. Fig. 4, is a horizontal elevation of the spool, detached from the frame, showing the angular slot. Fig. 5, is a plan view of the spool, detached, also showing the slot. Fig. 6, is a detached view of the spool, showing a modified form of slot. Fig. 7, is a view of the side opposite that shown in Fig. 1, in which the shoulder ($g$) appears in dotted lines.

A designates the frame attachable to the fence post in any suitable manner. ($a$) is a ledge projecting from a side of said frame in which there is a vertical slot, and thus far the construction of the frame does not differ materially from that shown and described in the patent above referred to.

($b$) is a double toothed ratchet pawl loosely mounted in the vertical slot in the ledge ($a$) and which drops by gravity into the ratchet teeth ($c$) of the winding spool B, which teeth lie on the outside of the frame, when the spool is journaled in said frame. By providing this pawl with two teeth, its efficiency is doubly increased, as the great strain due to the tightening of the wire is not confined to one tooth alone which latter construction, has sometimes been found to be unequal to the task. This I consider a very great improvement.

The winding spool B has integral rings or flanges ($e$) and ($f$) which fit in the openings in the sides of the frame. The latter flange, it will be noted, has two diameters. The part having the greatest diameter is designed to engage with the semi-circular shoulder ($g$) formed in the rear half of one of the openings in the frame, which parts are firmly locked so as to prevent any horizontal movement of the spool, when the wire is being stretched. The portion of the flange ($f$) having the smallest diameter, it will be noted from Fig. 2, projects slightly on the inside of the frame. The object of this feature, is to provide means for winding up the wire evenly. The journal openings in the frame are of a somewhat greater diameter than the widest diameter of the flange ($f$) on the spool, to admit of said spool being introduced therein, and it will be observed from Figs. 2 and 7, the shoulder ($g$) is formed in the rear half of the frame. These views show the flange ($f$) on the spool locked with said shoulder when said spool is drawn in that direction under the tension of the wire.

($i$) designates a slot in the spool in which the wire is placed, and by means of which said wire is drawn from both directions, as is shown in Fig. 3. This slot enters the spool on an incline as is shown in Fig. 4 and its inner ends terminate in an inward curve as at ($i'$) in a manner to secure the wire, in the initial turn, and prevent the same from slipping out of the slot.

In Fig. 6, I show a modified form of slot ($i''$) that may be used. This form of slot, however, would necessitate the introduction of the end of the wire, while in the preferred form ($i$) the wire may be placed in the slot at any point along said wire.

($j$) is a lug projecting from the spool adjacent to the flange ($e$), the object of which is to provide additional means to prevent the spool from slipping horizontally out of its bearings. ($j'$) is a slot in a side of the frame through which this lug is passed when the spool is being placed in its bearings.

Having described my invention, I claim—

The combination of the frame having openings in the sides thereof, and a shoulder formed in the rear half of one of said openings, with a winding spool provided with a slot in its middle portion, and with flanges (*e*) and (*f*) each of which has a two-fold diameter, by means of which the spool is maintained in an operative position, as is herein specified.

In testimony whereof I have hereunto set my hand this 21st day of May, 1894.

JOHN STAUFFER.

Witnesses:
S. A. DICKSON,
R. J. MCCARTY.